Patented Apr. 6, 1954

2,674,607

UNITED STATES PATENT OFFICE 2,674,607

METHOD FOR PREPARING AMINO-CARBOXYLIC ACIDS

Michailas Genas, Paris, France, assignor to Society Organico, Paris, France, a society of France No Drawing. Application April 11, 1950, Serial No. 155,369

Claims priority, application France April 14, 1949

3 Claims. (Cl. 260—404)

This invention relates to the preparation of aminocarboxylic acids.

It is known how to prepare aminoacids by reacting ammonia with halogenated acids in the so-called Hoffmann's method of preparing amines. Thus, α-aminoacids have been prepared from the corresponding halogenated acids, with good yields. It is also known however that the yield in amino-acids decreases as the amino group is further removed from the carboxyl group in the molecule. For example, Fläschentrager and Halle (Z. für physiol. Chem. 159, 286, 1926) obtained 10-aminoundecylic acid by reacting an alcoholic ammonia solution with 10-bromoundecylic acid with a yield of only about 4%. In the opinion of those authors, this low yield is due to distance separating the functional groups. According to Lutz (Zentralblatt 1, 907, 1910) the principal reaction products in the reaction of ammonia on β, γ, δ etc.-halogenated acids are corresponding oxyacids. The proportion of the latter increases with the distance separating the halogen and the carboxyl group.

Similarly, in the well-known work "Die Methoden der org. Chem." by Houben (vol. 4, 4th ed., 1941), it is stated that while the most convenient method of preparing α-aminoacids consists of reacting ammonia on the α-halogenated acids (loc. cit., p. 734), other methods of synthesis are generally adopted in the case of those amino-acids in which the amine group is further removed from the carboxyl group (p. 751).

It has already previously been discovered (cf. French Patent 928,265, published November 24, 1947), that 11-bromoundecanoic acid is readily converted to 11-aminoundecanoic acid under the action of ammonia. However, this fact was considered as exception.

The applicant has now found that, contrary to the generally accepted opinion, the distance between the carboxyl group and the halogen is not the decisive factor and that what really matters is that the halogen should be bonded to a primary carbon atom, that is a carbon atom bonded to two hydrogen atoms

wherein X is a halogen atom. Those halogenocarboxylic acids that contain the group $XCH_2$— can also be termed ω-halogenocarboxylic acids. When such halogenated acids are subjected to the action of aqueous, alcoholic or hydroalcoholic ammonia solutions, they are converted easily and with a high yield into the corresponding ω-aminocarboxylic acids, even where the halogen is bonded to a carbon atom at a position farther removed than β-position from the carboxyl group, or in other words, even though the halogen atom may be bonded to a carbon atom separated from the carboxyl group by a chain including more than one carbon atom.

These results are unexpected, and were unpredictable in view of the information to be found in existing literature.

The above-mentioned reaction occurs at relatively low temperatures. Its rate increases with the temperature. On the other hand the yield in amino-acids decreases as the temperature rises. Thus, if good yields are to be obtained, the reaction temperature should not exceed 80° C. and should preferably be lower than about 60° C.

The following examples will illustrate the invention without constituting a limitation thereon. All parts are in weight.

Example 1

The starting material is 10-bromodecanoic acid, which may be prepared by any suitable method, as by oxidation of undecylenyl bromide or by reaction of an acetic solution of hydrobromic acid with 10-oxydecanoic acid.

770 parts of 10-bromodecanoic acid are added in molten state into 6,000 parts of a 25% aqueous ammonia solution. The mixture is agitated. A somewhat fluid mass is formed and is maintained at about 15° C. The progress of the reaction is followed by dosing the amount of ammonium bromide formed.

The reaction comes to an end after about 6 days. At the end of this time, the reaction mass is drained. The resulting cake is washed with water, then taken up with 10 liters of boiling water. The mass is then acidified to a pH of about 5.4. Some amount of oily product and an insoluble residue separate from the mass, said residue chiefly comprising amino-didecanoic acid $NH[(CH_2)_9—COOH]_2$. This is filtrated hot and the clear filtrate is adjusted to a pH of from 6 to 6.3 by addition of a small amount of ammonia thereto. On cooling the 10-amino-decanoic acid cristallizes off. It is separated by a centrifuging step, and dried in a heating oven at 80° C. 400 parts of 10-amino-decanoic acid melting at 177° C. are thus obtained. Another 40 parts of the acid are recovered from the mother liquor. The yield is 77% of theoretical.

Example 2

A mixture of 10-bromodecanoic acid, 200 parts ethyl alcohol and 300 parts 30% aqueous ammonia solution is allowed to stand 10 days at 10° C. The mixture is then heated to the boil, whereupon the excess ammonia is eliminated and part of the alcohol distils away. After practically all the excess ammonia has been removed the mixture is acidified with hydrochloric acid to pH 3-4. A slightly cloudy solution is obtained of the hydrochloride of the aminoacid, which is clarified by hot filtration. The filtrate is adjusted with ammonia to a pH higher than 6.6. On cooling the 10-aminodecanoic precipitates. This acid is centrifuged, washed with water and dried in an oven at 80° C. 51 parts of practically pure 10-aminodecanoic acid are obtained.

Example 3

9-bromononanic acid (M. P. 33° C.) was prepared by reacting bromine with the silver salt of the ethyl monoester of sebacic acid and subsequent hydrolysing the resulting ethyl bromononanoate to obtain free bromo-acid (Ber. 75, 291, 1942). 118 parts of this acid are added to 1400 parts of a 27% aqueous ammonia solution. The mixture is subjected to agitation and maintained in a temperature range of from 0 to 5° C. for 20 days. The reaction mixture is then caused to boil, whereby the excess ammonia is removed, and 500 parts water distil off at the same time. The water suspension is acidified to pH 3 with hydrochloric acid, then filtrated hot. The filtrate is adjusted to pH 6.6 with ammonia, then brought to boiling point. Then, by filtration at elevated temperature, an insoluble precipitate comprising amino-dinonanoic acid

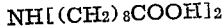
$$NH[(CH_2)_8COOH]_2$$

is separated. From this filtrate, on cooling, 52 parts 9-aminononanoic acid (M. P. 180–183° C.) crystallize off. The yield amounts to 60%. After re-crystallization in boiling water the resulting product melts at 188° C. If the amination reaction is carried out at 30° C., the reaction product predominantly comprises amino-didecanoic acid.

Similar procedures may be used for the amination of other ω-halogenated acids such as ω-bromobutanoic acid, ω-bromovalerianic acid, and ω-bromostearic acid.

It will be understood that the details of procedure described, and the exemplary compositions given, are merely illustrative and in no way restrictive of the scope of the invention.

What I claim is:

1. A method for producing an ω-amino carboxylic acid selected from the group consisting of 9-amino nonanoic acid and 10-amino decanoic acid which comprises reacting an aqueous ammonia solution with an ω-halogenated acid selected from the group consisting of ω-monohalogenated nonanoic and decanoic acids for a period of from about six to about twenty days, at a temperature between about 0° C. and about 15° C.

2. A method for producing 9-amino nonanoic acid which comprises reacting an aqueous ammonia solution with ω-halogenated nonanoic acid for a period of about twenty days at a temperature between about 0° C. and about 5° C.

3. A method for producing 10-amino decanoic acid which comprises reacting an aqueous ammonia solution with ω-monohalogenated decanoic acid for a period of from about six to about ten days at a temperature between about 10° C. and about 15° C.

References Cited in the file of this patent

UNITED STATES PATENTS

| Number | Name | Date |
|---|---|---|
| 2,109,929 | Rigby | Mar. 1, 1938 |
| 2,462,855 | Genas | Mar. 1, 1949 |